H. L. HASKELL AND J. W. BEIGER.
METHOD OF AND APPARATUS FOR MOLDING SHEET MATERIAL.
APPLICATION FILED MAY 17, 1918.

1,330,804.

Patented Feb. 17, 1920.
3 SHEETS—SHEET 1.

H. L. HASKELL AND J. W. BEIGER.
METHOD OF AND APPARATUS FOR MOLDING SHEET MATERIAL.
APPLICATION FILED MAY 17, 1918.
1,330,804.
Patented Feb. 17, 1920.
3 SHEETS—SHEET 2.
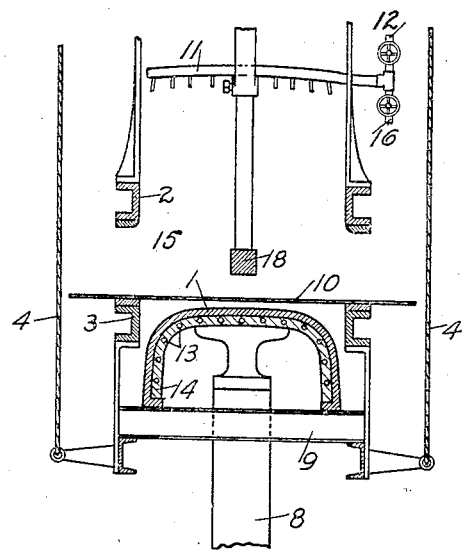
Fig 3.
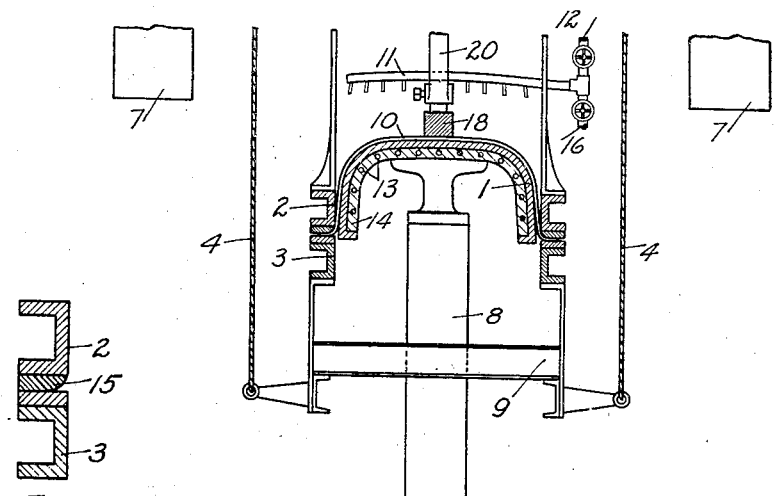
Fig 5
Fig-4.
INVENTOR.
H. L. Haskell
BY John W. Beiger
Chamberlin & Freudenreich
ATTORNEYS.

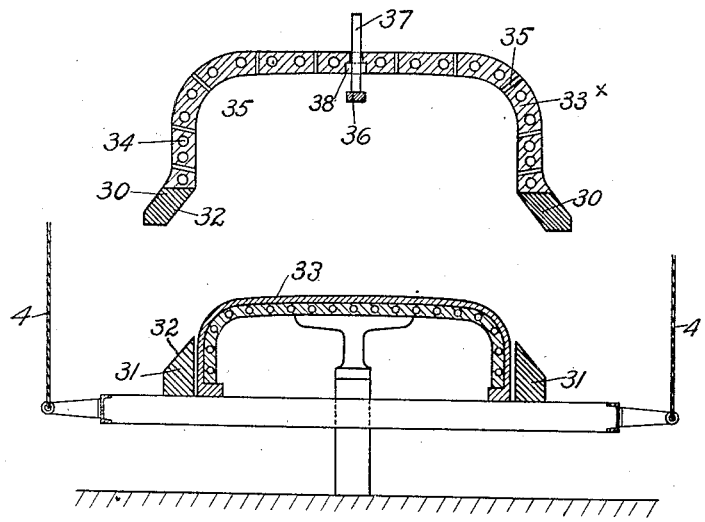

UNITED STATES PATENT OFFICE.

HENRY L. HASKELL, OF LUDINGTON, AND JOHN W. BEIGER, OF GRAND RAPIDS, MICHIGAN, ASSIGNORS TO HASKELITE MANUFACTURING CORPORATION, A CORPORATION OF NEW YORK.

METHOD OF AND APPARATUS FOR MOLDING SHEET MATERIAL.

1,330,804.   Specification of Letters Patent.   Patented Feb. 17, 1920.

Application filed May 17, 1918. Serial No. 235,119.

*To all whom it may concern:*

Be it known that we, HENRY L. HASKELL, a citizen of the United States, residing at Ludington, county of Mason, State of Michigan, and JOHN W. BEIGER, a citizen of the United States, residing at Grand Rapids, county of Kent, State of Michigan, have invented a certain new and useful Improvement in Methods of and Apparatus for Molding Sheet Material, and declare the following to be a full, clear, and exact description of the same, such as will enable others skilled in the art to which it pertains to make and use the same, reference being had to the accompanying drawings, which form a part of this specification.

Sheets of any kind may readily be given a form which is secured by a mere bending, which compresses the material on one side and places it under tension on the opposite side; but, where a shape is to be given which will produce a deflection or a curvature in two planes transverse to each other, the problem of molding the sheet is no longer a simple one. The present invention has to do with the art of molding sheets, more particularly sheets of wood or the like and sheets of laminated wood, so as to give them shapes which require a deflection or a curving of the material out of the normal plane along each of a plurality of lines transverse to each other; and has for its object to produce a simple and effective method and means for thus molding such material.

In molding a shape that is more complex than those produced by a mere simple bending action, a distortion of the sheet must take place which will make it impossible again to flatten out the sheet by simply unrolling it and it is the purpose of the present invention so to manipulate a sheet as to set into motion forces, or permit forces to act, which will produce the required distortion without tearing the sheet or, at points where there is an excess of material, permitting the sheet to lay itself into folds.

While the present invention may be applicable to other materials, it is particularly useful for molding or shaping laminated veneer of the kind referred to in the application of Henry L. Haskell, filed January 26, 1918, Serial No. 213,891 which relates to a laminated product cemented together by a bonding material which will permit the product to be boiled until the sheet becomes quite flexible. The necessary strength in the longitudinal direction and also in the transverse direction, so as to permit a sheet to be molded without breaking, may be secured either by crossing the grain of the wood in the various layers of the veneer or by introducing into the sheet or upon the sheet a reinforcing means such as wires, wire mesh, fabric, or other suitable means.

The various features of novelty whereby our invention is characterized will hereinafter be pointed out with particularity in the claims; but, for a full understanding of our invention and of its objects and advantages, reference may be had to the following detailed description taken in connection with the accompanying drawings, wherein:

Fig. 3 is a section on an enlarged scale taken approximately on line 3—3 of Fig. 1;

Fig. 4 is a view similar to Fig. 3 showing the condition of the parts at the end of the molding operation;

Fig. 5 is a section on an enlarged scale through one of the clamps for clamping the edges of the sheet;

Fig. 6 is a view partly in side elevation and partly in section showing a modified form of machine, more or less diagrammatically, by means of which a differently shaped shell than that which will be produced in the machine shown in Figs. 1 to 4, may be molded; and Fig. 7 is a section taken at right angles to the plane of Fig. 6.

In molding complex shapes, the veneer is first boiled or steamed until it reaches the desired degree of flexibility. The sheet is then yieldingly held at opposite edges and pressure is applied to the intermediate portions so as to deflect them out of the normal plane into the shape desired; the deflecting force being sufficient to overcome the yielding holding force at the edges so as to draw the edges toward each other. The change in shape from the flat state to what may be termed a dished shape may involve a bodily stretching of the material, a bodily compression, or a shearing of the material, that is a change which transforms an area which was originally square into an oblique parallelogram; or it may involve all of these factors. Therefore, regardless of the means that is employed to press the central portion of a sheet out of its normal plane, the holding means for the edges should be so designed that the necessary movement of the material in the vicinity of the edges of the sheet may be caused or permitted. We have found that by making the holding means in the form of clamps extending throughout the length of the edges which are being held, and regulating the clamping pressure, the sheets may be drawn through the clamps under a proper tension and frictional resistance, while at the same time a longitudinal displacement of the parts of the sheets may take place or be caused to take place.

While we believe that the principle of holding a sheet between yielding clamps and molding the sheet by applying pressure at points between the clamps so as to press the sheet out of its normal plane and gradually draw it from between the clamps may be carried out in a great variety of ways, and therefore do not desire to be limited to any one method or means for carrying it out, we shall confine the detailed description to particular methods and means that have successfully been put into practice.

Figure 1:
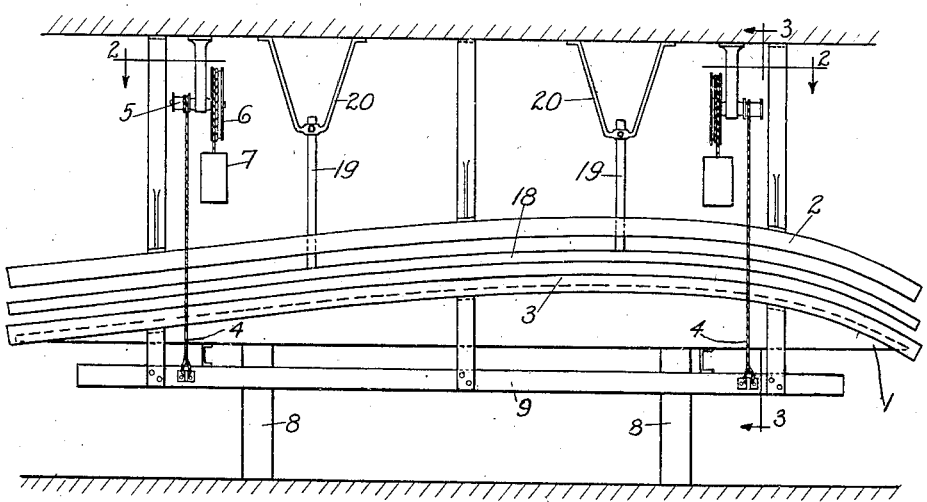
Figure 1 is a side elevation of a machine, more or less diagrammatically shown, for molding a shell of laminated veneer in accordance with the present invention.
Figure 2:
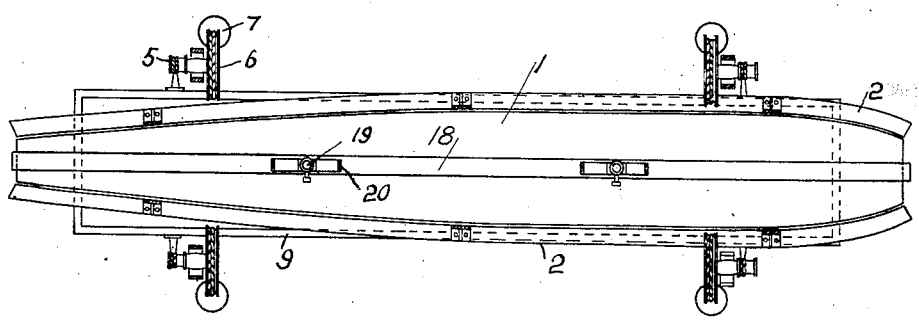
Fig. 2 is a section taken on line 2—2 of Fig. 1, showing all of the parts of the machine except some of the supports, in plan view.

In Figs. 1 to 5 there is illustrated a machine or apparatus by means of which sections of airplane fuselages have been produced. 1 represents a male die having the contour of the interior of the shell that is to be molded. A shell of this kind presents a curved line as viewed in plan, side elevation and front elevation and, in order effectually to draw the sheet to be molded over the die and make it fit snugly thereon in the manner of a skin, we curve the clamps between which the sheet is gripped in two planes at right angles to each other. In the arrangement shown, there are two clamps each comprising a pair of long rails, 2 and 3, one of which is stationary and the other of which is movable toward and from the same for the purpose of permitting the insertion of the sheet to be molded and permitting also the application of the desired holding or gripping pressure. The two pairs of clamping rails are placed on opposite sides of the path of movement of the die and their curvature, or rather the curvature at the inner edge of the gripping face of that rail over which the sheet is drawn, follows the general curvature at the widest portion of the die, as viewed in plan, while as viewed in side elevation it follows more or less closely the general longitudinal center line of the surface of the die. Since the purpose of the clamps is to permit the sheet to be drawn and fitted over the die, the clamps and the die must be movable bodily relatively to each other, it being immaterial whether the clamps or the die or both the clamps and the die are moved. In the arrangement shown, one rail of each clamp is made stationary and the die is made movable up and down through the space between the clamps. The movable rails of the clamps may be supported in any suitable way as, for example, by suspending them from cables, 4, which pass upwardly over small pulleys or drums, 5, fixed to large pulleys or drums, 6, from which are hung counterweights, 7. The die may be supported in any suitable way as, for example, upon hydraulic rams, 8. The movable clamping rails may conveniently be joined together by a frame, 9, which passes underneath the die to which the supporting cables 4 may be attached instead of being attached directly to the rails. The employment of the frame permits the die to act as an opening device for the clamps; the parts being so proportioned that when the die is lowered, it engages with the frame 9 and draws down the frame and the movable clamping rails against the resistance of the counterweights.

When it is desired to mold a sheet, the die is lowered into the position shown in Fig. 3, and the hot, wet, flexible sheet is laid across the top of the die and the movable rails, as indicated at 10. The die is then forced upwardly; the counterweights raising the rails until finally they are brought into clamping relation to the stationary rails and grip the sheet with a yielding pressure. It will be seen that the act of gripping the sheet in the clamps gives to the sheet a simple bend as seen in side view, because of the longitudinal curvature of the clamps in the vertical direction. Then, as the die travels upwardly, leaving the movable rails in their clamping position, the sheet is caused gradually to bulge upwardly so that the effect is that of gradually drawing the sheet snugly over and upon the die. During this upward movement of the die the sheet slips through the clamps so as to provide material as it is needed to maintain the constantly increasing length of line measured along the sheet from one clamp to the other. The slipping is not simply that which permits the sheet to be gradually drawn out from between the clamps but it is a compound slipping, including the slippage in the direction of the length of the clamps, as compression of the material in the longitudinal direction takes place.

The sheet must be made at least wide enough to leave its extreme edges in the clamps when the die has completed its upward movement, so as to permit the molded shell to be held in place until it has received a set which is necessary for it to have in order that it may retain its shape when removed from the molding machine into a drying room.

The sheet is in a hot, wet condition when it is placed into the machine and, in order to keep it wet and hot, steam may be applied to either or both surfaces of the sheet during the molding process and the die is preferably heated by steam or otherwise so that the sheet will not be chilled through its contact with the die. Steam may be sprayed upon the sheet during the molding process by means of a suitable spraying device, 11, supplied with steam through a valved pipe, 12. The die may conveniently be heated by making it in the form of a shell and lining it with steam pipes, 13, sealed against the inner surface of the shell by means of a layer of lead, 14.

The inner lower edge of each of the stationary clamping rails is preferably rounded, as indicated at 15 in Fig. 5, so as not to present a sharp corner over which the sheet must be carried as it is drawn out from between the clamps during the upward movement of the die.

At the end of the molding operation the parts are in the positions shown in Fig. 4, the lines along which the contact between the molded sheet and the clamps begins lying in proximity to and following the contour of the sides of the die at the widest part of the latter. Means should be provided for now drying the molded sheet or shell in a preliminary way so as to permit it to be removed from the machine and make the capacity of the machine as great as possible. This may conveniently be accomplished by blowing over the shell currents of air having a sufficient degree of dryness to permit the rapid taking up of moisture or by employing a heated female die or cover, suitably ventilated to permit the escape of the watery vapor. In the arrangement shown in Figs. 1 to 5, the spraying device, 11, which was employed for spraying steam upon the sheet to keep it hot and moist during the molding process may, if desired, be employed to spray air upon the molded shell; a valved air pipe, 16, being connected to the spraying device for this purpose.

Where the shape of the shell to be molded is such that portions that should be curved tend to remain straight and thus prevent the sheet from conforming itself accurately to the die, pressure may be applied on the upper surface of the sheet at the proper points to force the sheet to lie against the surface of the die. This force may be applied in any suitable way but it is preferably applied from the very beginning of the molding process or, at least, before the part of the sheet which is to be controlled in this manner has had an opportunity to follow the tendency which is to be overcome. In the arrangement shown, there is provided a follower, 18, in the form of a heavy bar, disposed above and having the contour of the longitudinal center line of the die. The follower has upwardly projecting rods or bars, 19, passing through suitable stationary guides, 20. After the sheet has been placed in the machine as shown in Fig. 3, the follower may be lowered until it rests upon the sheet, or the lowering of the follower may be postponed until after the sheet becomes firmly gripped in the clamps. The guiding rods are permitted to extend freely through the guides so that as the die rises the follower is simply pushed upwardly.

When the molded shell is to be removed from the machine, the die is simply lowered, passing out through the bottom of the shell, and finally engaging with the frame 9 and drawing the movable members of the clamps down to release the edges of the shell which may then be conveniently removed.

In Figs. 6 and 7 there is shown a machine that has been employed successfully in molding canoes. In this machine there are stationary rails 30, and coöperating movable rails, 31. The clamping faces of these rails, instead of being substantially horizontal, as in the other machine, are inclined at an acute angle, as indicated at 32, so that a continuation of these faces until they meet produces a figure V-shaped in cross section. The rails are not as long as the die 33, so as to leave the ends of the sheet that are to form the bow and stern of the canoe unclamped. Otherwise the clamps and stationary die, and the means for supporting and operating them may be substantially the same as in the arrangement previously described. In addition to the male die, there is employed a female die, 33×, into which the molded shell enters. The female die is heated by means of steam pipes, 34, or otherwise, and is provided with ventilating slots or openings, 35, distributed throughout the same for the purpose of permitting the moisture that is driven from the shell when it engages the female die or cover, to escape. The bar or rail, 36, which is adapted to engage the sheet along the part that is to constitute the keel, as heretofore explained in connection with the bar 18 or other means adapted for the same purpose, is guided by means of rods, 37, extending up through the female die; and the female die is preferably recessed, as indicated at 38, to permit the member 36 to move out of the way when its work has been done.

I claim:

1. The process of molding a sheet of wood which consists in applying pressure to a portion of the sheet transversely to the plane of the sheet while holding other portions in a grip which is sufficiently yielding to permit slipping under the aforesaid pressure.

2. The process of molding a sheet of wood which consists in holding it at a plurality of separated points in such a way that it is yieldingly gripped at at least one of the aforesaid points, and applying pressure to the sheet between said points so as to cause it to slip where it is yieldingly held.

3. The process of molding a sheet of wood which consists in yieldingly gripping it in a manner to leave a central portion free, and applying sufficient pressure to said portion transverse to the original plane thereof to cause the sheet to slip at points where it is gripped.

4. The process of molding a sheet of wood which consists in gripping it yieldingly along separated lines, and applying sufficient pressure to the intermediate portion of the sheet transverse to the original plane of the latter to cause the sheet to slip at said lines.

5. The process of molding a sheet of wood which consists in yieldingly holding it in clamps at separated points and applying sufficient pressure to the sheet between said points and transversely to the sheet to draw the sheet through the clamps.

6. The process of molding a sheet of wood which consists in placing it against separated guides or rails, holding it against the guides or rails with a yielding pressure, and then applying pressure transversely to the plane of the sheet in that portion of the sheet lying between the guides so as to draw the sheet over the edges of the guides.

7. The process of molding a sheet of wood into a dished shape which consists in placing it against guides or rails having the edges facing each other shaped to follow the contour of the sides of the molded product, holding the sheet against said guides or rails with a yielding pressure, and applying pressure transversely to the plane of the sheet between said guides or rails so as to deflect the sheet out of its normal plane and draw it over the edges of the guides or rails.

8. The process of molding a sheet of wood into a form having curved lines as viewed in two planes transverse to each other, which consists in placing the sheet against guides or rails curved in two directions, holding the sheet yieldingly against said guides or rails, and applying to that portion of the sheet lying between the guides or rails a pressure directed transversely of the plane of the sheet and of sufficient power to draw the sheet over the inner edges of the guides or rails.

9. The process of molding a sheet of wood which consists in yieldingly gripping it in a manner to leave a central portion free, and pressing against said central portion a die having the general shape of the interior of the finished product with a sufficient degree of pressure to cause the sheet to slip at points where it is gripped so as to permit the sheet to conform itself to the die.

10. The process of molding laminated wood veneer which consists in subjecting it to heat and moisture until it becomes more or less flexible, and then applying pressure to a portion of the sheet transversely to the plane thereof while holding other portions in a grip which is sufficiently yielding to permit slipping under the aforesaid pressure.

11. The process of molding laminated wood veneer which consists in subjecting it to heat and moisture until it becomes more or less flexible, then applying pressure to a portion of the sheet transversely to the plane thereof while holding other portions in a grip which is sufficiently yielding to permit slipping under the aforesaid pressure, and then passing currents of air over the molded sheet so as to dry the same more or less.

12. The process of molding laminated wood veneer which consists in subjecting it to heat and moisture until it becomes more or less flexible, then applying pressure to a portion of the sheet transversely to the plane thereof while holding other portions in a grip which is sufficiently yielding to permit slipping under the aforesaid pressure, and maintaining the sheet in a heated state during the molding process.

13. The process of molding laminated wood veneer which consists in subjecting it to the action of heat and moisture until it becomes more or less flexible, gripping it yieldingly in a manner to leave a central portion free, and then forcing a heated die against said central portion so as to deflect the latter out of its normal plane and cause the gripped portions of the sheet to slip as the sheet conforms itself to the die.

14. The process of molding laminated wood veneer which consists in subjecting it to the action of heat and moisture until it becomes more or less flexible, gripping it yieldingly in a manner to leave a central portion free, then forcing a heated die against said central portion so as to deflect the latter out of its normal plane and cause the gripped portions of the sheet to slip as the sheet conforms itself to the die, and passing currents of air over the molded sheet after it has taken its final form.

15. The process of molding a sheet of laminated wood veneer which consists in subjecting it to the action of heat and moisture until it becomes more or less flexible, and then drawing it over a convex die having the shape of the shell to be formed and permitting the sheet sufficient freedom of movement along the same to enable it to be compressed longitudinally and thus fit itself to the contour of the die without wrinkling.

16. The process of molding laminated wood veneer which consists in subjecting it to heat and moisture until it becomes more or less flexible, then applying pressure to a portion of the sheet transversely to the plane thereof while holding other portions in a grip which is sufficiently yielding to permit slipping under the aforesaid pressure, and then heating the molded shell to effect drying.

17. In a machine of the character described, two pairs of clamping rails spaced apart from each other, said rails being curved from end to end in side elevation and being also curved as viewed from above, a male die movable upwardly between the two pairs of rails, said die as viewed from above having a size and shape corresponding to the size and shape between the two pairs of rails and having a longitudinal center line following in a general way the curvature of the rails as viewed in side elevation.

18. In a machine of the character described, a pair of separated rails having longitudinally-extended work-engaging elements curved as viewed in plan and curved in the longitudinal direction as viewed in side elevation, means for yieldingly holding a sheet against said work-engaging elements in such a manner that the elements of the sheet remain straight lines in the transverse direction and take the longitudinal curvature of said elements in the longitudinal direction, a die, and means for moving the die transversely of the plane of the sheet through the space between said rails.

19. The process of molding a sheet of non-ductile compressible material which consists in holding it at a plurality of separated points in such a way that it is yieldingly gripped at at least one of the aforesaid points, and applying pressure against one side of the sheet between said points so as to cause it to slip where it is yieldingly held while leaving the other side of the central portion of the sheet unconfined.

20. The process of molding a sheet of laminated wood veneer which consists in subjecting it to the action of heat and moisture until it becomes more or less flexible, and then yieldingly gripping the sheet at its edges and drawing it over a convex die having the shape of the shell to be formed without attempting to confine the outer surface of the sheet where the sheet is in contact with the die, thus permitting the sheet to move with sufficient freedom along the die to enable it to be compressed longitudinally and fit itself to the contour of the die without wrinkling.

21. The process of molding a sheet of wood into a form having curved lines as viewed in plan and in side elevation, which consists in placing the sheet against separated guides or rails curved from end to end as viewed in plan and in side elevation, holding the sheet yieldingly against said guides or rails, and then applying to that portion of the sheet lying between the guides or rails a pressure directed transversely to the plane of the sheet and great enough to draw the sheet over the inner edges of the guides or rails.

In testimony whereof we sign this specification.

HENRY L. HASKELL.
JOHN W. BEIGER.